(12) United States Patent
Strengert et al.

(10) Patent No.: US 9,643,584 B2
(45) Date of Patent: May 9, 2017

(54) METHOD FOR OPERATING A BRAKING SYSTEM OF A VEHICLE, AND CONTROL DEVICE FOR A BRAKING SYSTEM OF A VEHICLE

(71) Applicant: Robert Bosch GmbH, Stuttgart (DE)

(72) Inventors: Stefan Strengert, Stuttgart (DE); Yasutaka Nagakura, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 140 days.

(21) Appl. No.: 14/650,339

(22) PCT Filed: Oct. 23, 2013

(86) PCT No.: PCT/EP2013/072145
§ 371 (c)(1),
(2) Date: Jun. 8, 2015

(87) PCT Pub. No.: WO2014/090472
PCT Pub. Date: Jun. 19, 2014

(65) Prior Publication Data
US 2015/0307072 A1    Oct. 29, 2015

(30) Foreign Application Priority Data

Dec. 12, 2012    (DE) .................. 10 2012 222 978

(51) Int. Cl.
*B60T 13/74* (2006.01)
*B60T 13/68* (2006.01)
(Continued)

(52) U.S. Cl.
CPC .......... *B60T 13/686* (2013.01); *B60T 8/3265* (2013.01); *B60T 8/4872* (2013.01); *B60T 13/162* (2013.01);
(Continued)

(58) Field of Classification Search
CPC .... B60T 8/3265; B60T 8/4872; B60T 13/162; B60T 13/662; B60T 13/686; B60T 13/745; B60T 2270/604
(Continued)

(56) References Cited

U.S. PATENT DOCUMENTS

| 8,523,297 | B2 * | 9/2013 | Morishita | ................. B60T 1/10 303/151 |
| 8,632,136 | B2 * | 1/2014 | Nozawa | ................... B60T 1/10 303/115.2 |

(Continued)

FOREIGN PATENT DOCUMENTS

| CN | 102371985 A | 3/2012 |
| CN | 102470841 A | 5/2012 |

(Continued)

OTHER PUBLICATIONS

International Search Report for PCT/EP2013/072145, dated Jan. 27, 2014.

*Primary Examiner* — Thomas Irvin
(74) *Attorney, Agent, or Firm* — Gerard Messina (57) ABSTRACT

A method for operating a braking system includes: limiting a brake pressure buildup in a brake circuit of the braking system to a response pressure of a storage volume of the brake circuit by controlling a first wheel outlet valve of a first wheel brake cylinder of the brake circuit into an opened state at least temporarily during an increasing activation intensity of an activation of a brake actuating element connected to a master break cylinder; providing an additional reduction of a brake pressure in the brake circuit to below the response pressure during a constant activation intensity by controlling the first wheel outlet valve into a closed state; and activating a brake booster in such a way (Continued)

that an internal pressure present in the master brake cylinder is reduced with the aid of the activated brake booster.

10 Claims, 2 Drawing Sheets

(51) Int. Cl.
    *B60T 8/32* (2006.01)
    *B60T 8/48* (2006.01)
    *B60T 13/16* (2006.01)
    *B60T 13/66* (2006.01)

(52) U.S. Cl.
    CPC .......... *B60T 13/662* (2013.01); *B60T 13/745* (2013.01); *B60T 2270/604* (2013.01)

(58) Field of Classification Search
    USPC .......................... 303/151, 152, 114.1, 113.3
    See application file for complete search history.

(56) References Cited

U.S. PATENT DOCUMENTS

| | | | | |
|---|---|---|---|---|
| 8,840,198 B2* | 9/2014 | Vollert | ................. | B60T 8/4291 303/11 |
| 8,864,244 B2* | 10/2014 | Leiber | ...................... | B60T 8/00 188/157 |
| 8,892,327 B2* | 11/2014 | Hachtel | ................ | B60T 8/3265 701/32.1 |
| 9,308,897 B2* | 4/2016 | Watanabe | ................ | B60T 1/10 |
| 9,403,516 B2* | 8/2016 | Strengert | ................. | B60T 1/10 |
| 2001/0006306 A1* | 7/2001 | Kagawa | .................. | B60T 8/367 303/20 |
| 2003/0173826 A1* | 9/2003 | Tazoe | ...................... | B60L 7/26 303/152 |
| 2005/0269875 A1* | 12/2005 | Maki | ......................... | B60L 7/26 303/152 |
| 2006/0004507 A1* | 1/2006 | Teslak | ..................... | B60K 6/12 701/69 |
| 2007/0228823 A1* | 10/2007 | Kokubo | .................... | B60T 7/22 303/155 |
| 2007/0267915 A1* | 11/2007 | Shimada | .................. | B60K 6/44 303/122 |
| 2009/0045672 A1* | 2/2009 | Nishino | .................. | B60T 7/042 303/113.3 |
| 2010/0084914 A1 | 4/2010 | Hatano et al. | | |
| 2010/0187901 A1* | 7/2010 | Sonoda | ..................... | B60L 7/10 303/11 |
| 2011/0066345 A1* | 3/2011 | Nasu | ......................... | B60L 7/24 701/70 |
| 2011/0251769 A1* | 10/2011 | Weiberle | .................. | B60T 1/10 701/70 |
| 2011/0254358 A1* | 10/2011 | Strengert | .................. | B60T 1/10 303/3 |
| 2011/0304198 A1* | 12/2011 | Cottrell, V | ................ | B60L 7/26 303/2 |
| 2012/0160619 A1* | 6/2012 | Isono | .................... | B60T 13/165 188/106 P |
| 2013/0049450 A1* | 2/2013 | Kunz | ...................... | B60T 8/267 303/3 |
| 2013/0062932 A1* | 3/2013 | Yagashira | ............... | B60T 8/442 303/3 |
| 2013/0181506 A1* | 7/2013 | Weiberle | ................. | B60T 7/042 303/3 |
| 2015/0197230 A1* | 7/2015 | Kolarsky | .............. | B60T 8/3265 701/70 |
| 2015/0210256 A1* | 7/2015 | Yamashita | ................ | B60T 7/22 303/14 |
| 2016/0304074 A1* | 10/2016 | Maucher | ............... | B60T 8/4072 |

FOREIGN PATENT DOCUMENTS

| | | |
|---|---|---|
| DE | 196 04 134 | 8/1997 |
| FR | 2 860 474 | 4/2005 |
| WO | WO 2009/083216 | 7/2009 |
| WO | WO 2010/069659 | 6/2010 |
| WO | WO 2010/069679 | 6/2010 |
| WO | WO 2010/091756 | 8/2010 |
| WO | 2012156125 A1 | 11/2012 |

* cited by examiner

METHOD FOR OPERATING A BRAKING SYSTEM OF A VEHICLE, AND CONTROL DEVICE FOR A BRAKING SYSTEM OF A VEHICLE

BACKGROUND OF THE INVENTION

1. Field of the Invention

The present invention relates to a control device and a method for operating a braking system of a vehicle.

2. Description of the Related Art

A method and a device for controlling a braking system of a motor vehicle which includes an electric drive are described in published German patent application document DE 196 04 134 A1. During braking of the vehicle using the electric drive, for simultaneously charging a battery the aim is to reduce/deactivate the hydraulic braking torque exerted on at least one wheel by the at least one wheel brake cylinder of the hydraulic braking system, despite activating the brake pedal. For this purpose, the pressure medium which is displaced from the master brake cylinder to the wheel brakes by activating the brake pedal is to be counteracted by transferring the pressure medium, which is displaced from the master brake cylinder, via the at least one wheel brake cylinder into at least one storage chamber by opening the wheel outlet valves of the hydraulic braking system. The aim is that regenerative braking carried out by the electric drive may be blended in this way.

BRIEF SUMMARY OF THE INVENTION

The present invention allows a brake pressure to be adjusted to below a response pressure of the storage volume of the at least one brake circuit, despite activating the brake actuating element which is situated at/connected to the master brake cylinder. Thus, despite the direct braking of the master brake cylinder by the driver, a brake pressure buildup is reliably preventable/stoppable in the at least one brake circuit. In particular a brake pressure of (virtually) zero may be maintained in all brake circuits despite the completed activation of the brake actuating element, for example, a brake pedal.

When executing the present invention, no residual grinding torques remain which conventionally occur when blending according to the response pressure/spring force of a storage volume. Instead, the brake pressures may be decreased at both axles to (virtually) 0 bar. By additionally reducing the brake pressure at least in the at least one brake circuit to below the response pressure of the storage volume of the at least one brake circuit, wear of the brake linings may be reduced. The present invention thus contributes to protecting the brake linings.

The method according to the present invention and the corresponding control device are advantageous in particular for a recuperative braking system. By use of the present invention for a recuperative braking system, the recuperation efficiency may be increased during a recuperation, and a vehicle battery may thus be charged more quickly. The present invention thus ensures driving of a vehicle with lower energy consumption and reduced pollutant emissions. However, it is pointed out that the usability of the present invention is not limited to recuperative braking systems.

In an advantageous specific embodiment, the brake booster is activated in such a way that a booster force, which boosts a force exerted by the activation of the brake actuating element on the at least one piston of the master brake cylinder, exerted with the aid of the brake booster on at least one piston of the master brake cylinder, is reduced for the reduction of the internal pressure. Energy may be thus additionally saved which would otherwise be used by the brake booster.

In an alternative specific embodiment, the brake booster may be activated in such a way that a counterforce to the force exerted on the at least one piston of the master brake cylinder by the activation of the brake actuating element is exerted with the aid of the activated brake booster. In this way, the present invention may also be executed in a corresponding design of the brake booster even when the activation of the brake actuating element by the driver is not supported with the aid of the brake booster.

Preferably, while limiting the pressure buildup in the at least one brake circuit to the response pressure and/or during the additionally reduction of the brake pressure in the at least one brake circuit to below the response pressure, at least one first wheel inlet valve of the at least one first wheel brake cylinder is controlled into an opened state, and at least one second wheel inlet valve of at least one second wheel brake cylinder of the at least one brake circuit is controlled into a closed state. It is thus possible to blend only via one of the two wheel brake cylinders. In this way it is preventable that a pressure corresponding to the response pressure of the storage volume of the at least one brake circuit is built up in the at least one second wheel brake cylinder in particular during the limiting of the pressure buildup in the at least one brake circuit to the response pressure in the at least one second wheel brake cylinder. This ensures an additional protection of the at least one second wheel brake cylinder.

In one advantageous refinement, prior to limiting the pressure buildup in the at least one brake circuit to the response pressure, and/or prior to the additional reduction of the brake pressure in the at least one brake circuit to below the response pressure, it is ascertained whether a generator braking torque corresponding to an activation intensity of the activation of the brake actuating element is exertable with the aid of at least one electric motor of the vehicle, and the limiting, of the pressure buildup in the at least one brake circuit to the response pressure and/or the additional reduction of the brake pressure in the at least one brake circuit to below the response pressure is carried out only if the generator braking torque corresponding to the activation intensity is exertable with the aid of the at least one electric motor. The brake pressure in the at least one brake circuit, which is reduced compared to the related art, may thus be utilized to exert a comparatively large generator braking torque on the vehicle, without exceeding a setpoint total braking torque specified by the driver. The advantageous method thus allows more rapid charging of a vehicle battery, for example.

Preferably, provided that it is ascertained after the limiting of the pressure buildup in the at least one brake circuit to the response pressure and/or after additionally reducing the brake pressure in the at least one brake circuit to below the response time that the generator braking torque corresponding to the activation intensity is no longer exertable with the aid of the at least one electric motor, the at least one second wheel inlet valve of the at least one second wheel brake cylinder is controlled from the closed state into an opened state. In this way, with the aid of a brake pressure buildup in the second wheel brake cylinder, a response to reduced usability of the at least one electric motor and/or to a comparatively high driver braking input may be made quickly and reliably.

After controlling the at least one second wheel inlet valve from the closed state into the opened state, $\Delta p$ regulation may optionally be carried out with the aid of the at least one first wheel inlet valve of the at least one first wheel brake cylinder. The brake pressure may thus be (virtually) exactly adjusted in the at least one brake circuit in such a way that a setpoint vehicle deceleration specified by the driver may be reliably adhered to.

In addition, if, after controlling the at least one second wheel inlet valve from the closed state into the opened state, it is ascertained that the generator braking torque corresponding to the activation intensity is once again exertable with the aid of the at least one electric motor, the brake pressure present in the at least one brake circuit is limited by controlling the at least one first wheel inlet valve and the at least one first wheel outlet valve into the opened state. The brake pressure present in the at least one brake circuit may thus be reliably decreased in such a way that the at least one electric motor is useable for charging a vehicle battery without a setpoint vehicle deceleration specified by the driver being exceeded.

Furthermore, for again additionally reducing the brake pressure in the at least one brake circuit below the response pressure, the at least one first wheel outlet valve of the at least one first wheel brake cylinder may be controlled into the closed state during a decreasing activation intensity of the activation of the brake actuating element, and the brake booster may be activated in such a way that the internal pressure present in the master brake cylinder is again decreased with the aid of the activated brake booster. The brake pressure present in the at least one brake circuit may thus be reliably reduced below the response pressure in this type of situation as well.

The above-mentioned advantages are also ensured in this type of control device for a braking system of a vehicle. It is expressly pointed out that the control device may be refined corresponding to the specific embodiments of the method for operating a braking system of a vehicle.

Furthermore, the described advantages are ensured in a braking system for a vehicle which includes this type of control device.

DETAILED DESCRIPTION OF THE INVENTION

Figure 1:
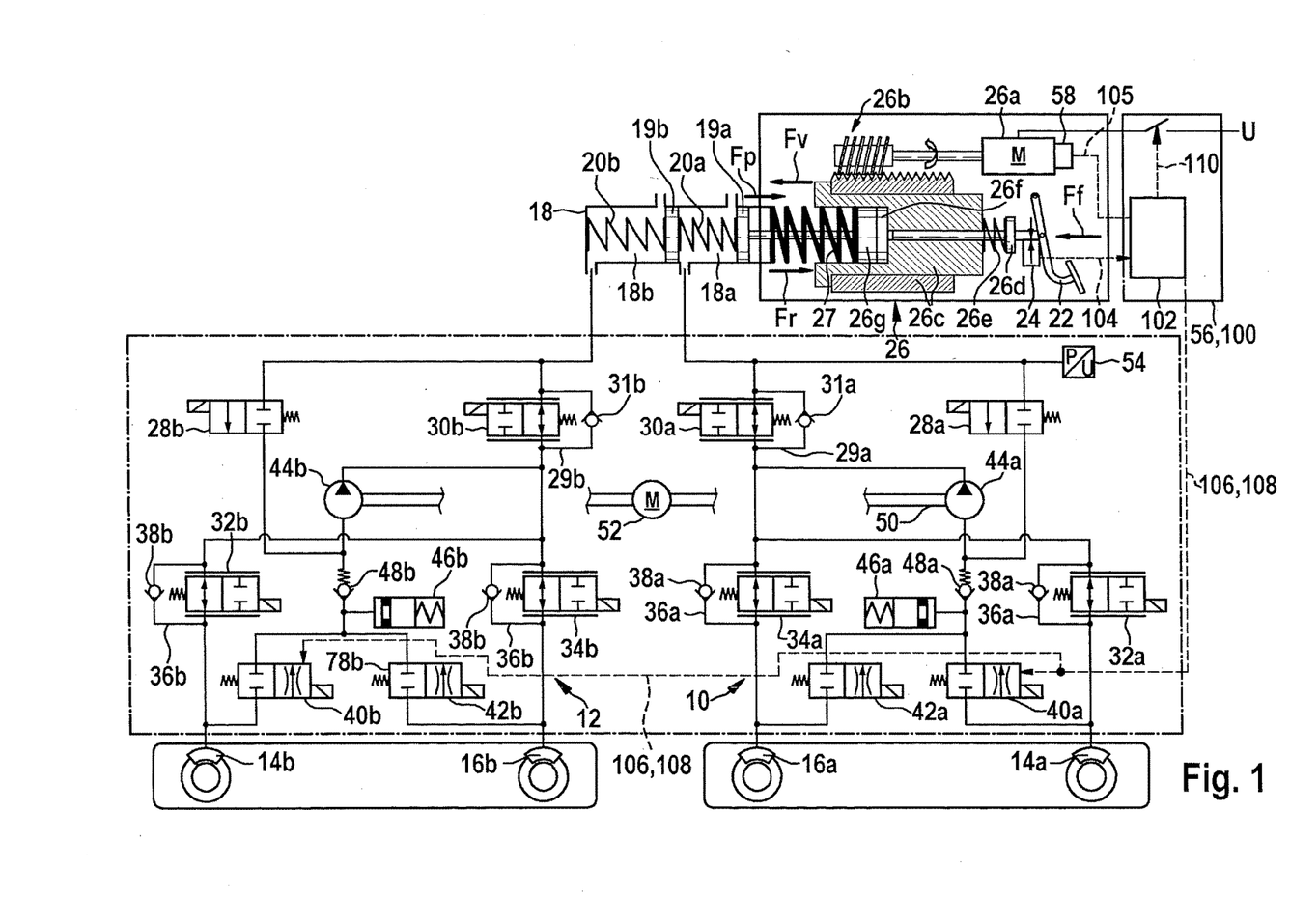
FIG. 1 shows a schematic illustration of one specific embodiment of the control device.

FIG. 1 shows a schematic illustration of one specific embodiment of the control device.

Control device 100 and the braking system which cooperates with it, schematically depicted in FIG. 1, are advantageously usable in a hybrid vehicle or in an electric vehicle, for example. However, the usability of control device 100 and of the braking system described below is not limited to use in a hybrid vehicle or in an electric vehicle.

The braking system includes a first brake circuit 10 and a second brake circuit 12 including at least one wheel brake cylinder 14a, 14b, 16a and 16b, respectively. Each of the two brake circuits 10 and 12 optionally includes a first wheel brake cylinder 14a or 14b and a second wheel brake cylinder 16a and 16b. Preferably, first wheel brake cylinder 14a of first brake circuit 10 and second wheel brake cylinder 16a of first brake circuit 10 are in this case assigned to different vehicle axles, first wheel brake cylinder 14b of second wheel brake cylinder 12 and second wheel brake cylinder 16b of second brake circuit 12 also being assigned to different vehicle axles. First wheel brake cylinders 14a and 14b may in particular be assigned to the rear axle, while second wheel brake cylinders 16a and 16b are assigned to the front axle. However, the braking system described below is not limited to this type of brake circuit division (X brake circuit division). For example, the wheels associated with a brake circuit 10 and 12 may also be situated on the same axle of the vehicle, or on one side of the vehicle.

The braking system includes a master brake cylinder 18 which may be designed as a tandem master brake cylinder, for example. Master brake cylinder 18 may include at least one adjustable piston 19a and 19b, which is at least partly displaceable in at least one pressure chamber 18a or 18b of master brake cylinder 18. Preferably, master brake cylinder 18 includes a first displaceable piston 19a which may be referred to as a rod piston, which at least partly protrudes (with a first return spring 20a) into a first pressure chamber 18a of master brake cylinder 18 assigned to first brake circuit 10, and a second displaceable piston 19b which may be referred to as a floating piston, which at least partly protrudes (with a second return spring 20b) into a second pressure chamber 18b of master brake cylinder 18 assigned to second brake circuit 12. Master brake cylinder 18 may be connected to a brake fluid reservoir (not shown) via at least one brake fluid exchange opening, for example a snifting bore. However, the usability of control device 100 is not limited to the use of a tandem master brake cylinder or to a specific design of master brake cylinder 18.

The braking system preferably includes a brake actuating element 22, for example, a brake pedal, which is situated at master brake cylinder 18. Brake actuating element 22 is advantageously situated at master brake cylinder 18 in such a way that when brake actuating element 22 is activated with at least a minimum braking activation intensity, a driver braking force Ff applied to brake actuating element 22 is transmittable to at least one displaceable piston 19a and 19b, for example to the rod piston and the floating piston, in such a way that the at least one piston 19a and 19b is displaceable with the aid of the driver braking force Ff. With the aid of this displacement of the at least one piston 19a and 19b, an internal pressure in at least one pressure chamber 18a and 18b of master brake cylinder 18 may be increased.

The braking system preferably also includes at least one brake actuating element sensor 24, with the aid of which the activation intensity of the activation of brake actuating element 22 is ascertainable by the driver. The at least one brake actuating element sensor 24 may be a pedal travel sensor, a differential travel sensor, and/or a rod travel sensor, for example. However, for detecting the activation intensity which corresponds to the driver braking input, some other type of sensor system may be used instead of or in addition to the types of sensors described here.

The illustrated braking system also includes a brake booster 26. With the aid of brake booster 26, a booster force Fv may be exerted on the at least one piston 19a and 19b of master brake cylinder 18 in such a way that activation of brake actuating element 22 is facilitated for the driver. In this case, booster force Fv acts together with driver braking force Ff against a restoring force Fr of a return spring 27 and a pressure force Fp effectuated by the internal pressure in at least one pressure chamber 18a and 18b of master brake cylinder 18.

Brake booster 26 may in particular be a continuously regulatable/continuously controllable brake booster 26. The braking system illustrated in FIG. 1 includes an electromechanical brake booster 26. An electromechanical brake booster 26 is characterized by a variable booster force Fv. Brake booster 26 of FIG. 1 includes a motor 26a, a transmission 26b, a booster body 26c, an input rod 26d, a differential movement spring 26e, a reaction disk 26f and an output rod 62g. With the aid of electromechanical brake booster 26, it is thus possible to easily influence the brake actuation force which is perceivable to the driver during braking. Instead of an electromechanical brake booster 26, however, the braking system which cooperates with control device 100 may include some other type of brake booster 26.

Further components of the specific embodiment of the braking system are described below with reference to FIG. 1. It is expressly pointed out that the components of the braking system described below represent only one example of a possible design of the advantageous braking system having control device 10. One advantage of control device 100, described in greater detail below, is that brake circuits 10 and 12 which cooperate with it are not limited to a specific design, or to the use of specific components. Instead, brake circuits 10 and 12 may be modified with a great freedom of choice without compromising the advantages of equipping the braking system with control device 100:

Each of brake circuits 10 and 12 is designed in such a way that the driver is able to directly brake wheel brake cylinders 14a, 14b, 16a, and 16b via master brake cylinder 18. Each of brake circuits 10 and 12 includes a high-pressure switching valve 28a or 28b, and a changeover valve 30a or 30b (each with a bypass line 29a and 29b, running in parallel thereto, and a check valve 31a and 31b situated in each bypass line 29a and 29b). In first brake circuit 10, a first wheel inlet valve 32a is associated with first wheel brake cylinder 14a, and a second wheel inlet valve 34a is associated with second wheel brake cylinder 16a, each with a bypass line 36a running in parallel thereto, and with a check valve 38a situated in each bypass line 36a. In addition, a first wheel outlet valve 40a is assigned to first wheel brake cylinder 14a and a second wheel outlet valve 42a is assigned to second wheel brake cylinder 16a in first brake circuit 10. Correspondingly, a first wheel inlet valve 32b is assigned to first wheel brake cylinder 14b and a second wheel inlet valve 34b is assigned to second wheel brake cylinder 16b in second brake circuit 12. In each case a bypass line 36b with a check valve 38b situated therein runs in parallel to each of the two wheel inlet valves 32b and 34b of second brake circuit 12. Furthermore, a first wheel outlet valve 40b is assigned to first wheel brake cylinder 14b and a second wheel outlet valve 42b is assigned to second wheel brake cylinder 16b also in the second brake circuit 12.

In addition, each of brake circuits 10 and 12 includes a pump 44a and 44b, whose intake side is connected to wheel outlet valves 40a and 42a or 40b and 42b, and whose discharge side faces wheel inlet valves 32a and 34a or 32b and 34b. Each of brake circuits 10 and 12 additionally includes a storage chamber 46a or 46b, as a storage volume 46a or 46b, situated between wheel outlet valves 40a and 42a or 40b and 42b and associated pump 44a or 44b, and a pressure relief valve 48a or 48b situated between pump 44a or 44b, and storage chamber 46a or 46b. Each of storage chambers 46a and 46b may in particular be a low-pressure storage chamber. It is pointed out that storage chambers 46a and 46b are usable as ESP storage chambers in the two brake circuits 10 and 12.

Pumps 44a and 44b may each be situated on a shared shaft 50 of a motor 52. Each of pumps 44a and 44b may be designed as a three-piston pump. Instead of a three-piston pump, however, some other type of pump may be used for at least one of pumps 44a and 44b. Modulation systems having a different design, such as pumps including more or fewer pistons, asymmetrical pumps, or gear pumps, are likewise usable. The braking system which cooperates with control device 100 may thus be designed as a modified standard modulation system, in particular as a six-piston ESP system.

Furthermore, each of the two brake circuits 10 and 12 may also include at least one pressure sensor 54, in particular for ascertaining a system pressure and/or a circuit pressure.

The above-described braking system is controllable with the aid of control device 100, described below. However, it is pointed out once more that the usability of control device 100 described below is not limited to the cooperation with a braking system having this type of design. Control device 100 described below may be integrated in particular into a control electronics system 56 of brake booster 26 or into a control electronics system of the braking system. However, it is pointed out once again that the design of brake booster 100 is not limited to the above designs. For example, control device 100 may also be used together with a control electronics system 56 of brake booster 26 and/or a control electronics system of the braking system which is provided and situated separately therefrom.

Control device 100 includes an actuating device 102, with the aid of which at least one first wheel outlet valve 40a and 40b of at least one first wheel brake cylinder 14a and 14b of at least one of brake circuits 10 and 12 is activatable. The actuation of at least the at least one first wheel outlet valve 40a and 40b by actuating device 102 takes place taking into account at least one provided sensor signal 104 with regard to an activation intensity of an activation by a driver of the vehicle of brake actuating element 22 which is situated at master brake cylinder 18. For example, brake actuating element sensor 24 may provide actuating device 102 with a pedal travel, a rod travel, a driver's brake pressure and/or driver's braking force Ff, or a corresponding variable, as sensor signal 104. Optionally it is also possible that a signal 105 of a sensor 58 of brake booster 26, for example, a rotation angle sensor may be taken into account by actuating device 102. Optionally, at least one additional piece of information regarding a generator braking torque maximally exertable with the aid of at least one electric motor operatable as a generator (not shown) may be provided to actuating device 102 and be analyzable by same.

Actuating device 102 is designed to control at least one first wheel outlet valve 40a and 40b of the brake circuits 10 and 12 in such a way that a brake pressure buildup is limitable in at least one of the two brake circuits 10 and 12 to a response pressure of the storage volume/of the storage chamber 46a and 46b of the respective brake circuit 10 and 12 (despite a brake fluid displaced from the master brake cylinder of the braking system into brake circuits 10 and 12.) For this purpose, actuating device 102 (at least temporarily) outputs a first control signal 106 to the at least one first wheel outlet valve 40a and 40b during an increasing activation intensity of the activation of brake actuating element 22.

Furthermore, taking at least the provided sensor signal 104 into account, brake booster 26 is additionally controllable with the aid of actuating device 102 in such a way that, after the at least one wheel outlet valve 40a and 40b is controlled by a second control signal 108 with the aid of actuating device 102 into a closed state, an internal pressure present in master brake cylinder 18 is reducible with the aid of the activated brake booster 26. In particular the internal pressure in master brake cylinder 18 is reducible with the aid of brake booster 26 activated by an additional control signal 110 in such a way that the brake pressure in at least one brake circuit 10 and 12 is further reducible to below the response pressure. For example, a supply voltage U of brake booster 26 may be variable with the aid of the additional control signal 110.

The reduction of the internal pressure in master brake cylinder 18 effectuates a brake fluid displacement (from brake circuits 10 and 12 into master brake cylinder 18), thereby making the pressure present in brake circuits 10 and 12 reducible to below the response pressure of storage chambers 46a and 46b used as storage volumes 46a and 46b of brake circuits 10 and 12. In this way, the brake pressure present in first wheel brake cylinders 40a and 40b, via which (at least temporarily) brake fluid is displaced during an increasing activation intensity of the activation of the brake actuating element 22, and whose first wheel inlet valves 32a and 32b are therefore present in an opened state, is also reducible. With the effectuated reduction of the brake pressure in the first wheel brake cylinders 40a and 40b, a wearing of their brake linings may be prevented/delayed. Control device 100 may thus also be used for protecting the brake linings.

The brake pressure reduction effectuated in brake circuits 10 and 12 to below the response pressure of storage chambers 46a and 46b used as storage volumes of 46a and 46b of brake circuits 10 and 12 may be used to increase the generator braking torque exerted with the aid of at least one electric motor (not shown). A battery of the vehicle equipped with the braking system may thus be charged more quickly without a vehicle deceleration, specified by a driver by activating brake actuating element 22, being exceeded.

The braking system equipped with control device 100 thus combines the advantages of a high recuperation efficiency with the capability of carrying out blending. In addition, by using control device 100 it is possible to carry out the blending without retroactive effects on brake actuating element 22 being noticeable to the driver.

It is expressly pointed out that the advantages described above occur independently of a level of the response pressure of storage chambers 46a and 46b, used as storage volumes 46a and 46b of brake circuits 10 and 12. The response pressure of storage volumes 46a and 46b of brake circuits 10 and 12 may thus also be relatively high. Thus, inexpensive storage volumes 46a and 46b may also be used together with control device 100.

Furthermore, control device 100 may be additionally designed for carrying out the method steps described below. A more detailed description of further achievable modes of operation of control device 100 is therefore dispensed with here.

The above-described advantages are also achieved in a braking system for a vehicle which includes control device 100 or an appropriate refinement of control device 100.

FIGS. 2a through 2d show four coordinate systems for illustrating one specific embodiment of the method for operating a braking system of a vehicle.

For better clarity, the method is described using the above-described recuperative braking system, the first wheel brake cylinder of the two brake circuits being assigned to a rear axle and the second wheel brake cylinders of the two brake circuits being assigned to a front axle of the vehicle. However, the practicability of the method is not limited to the use of the above-described braking system or to this assignment of the wheel brake cylinders.

Figure 2A:
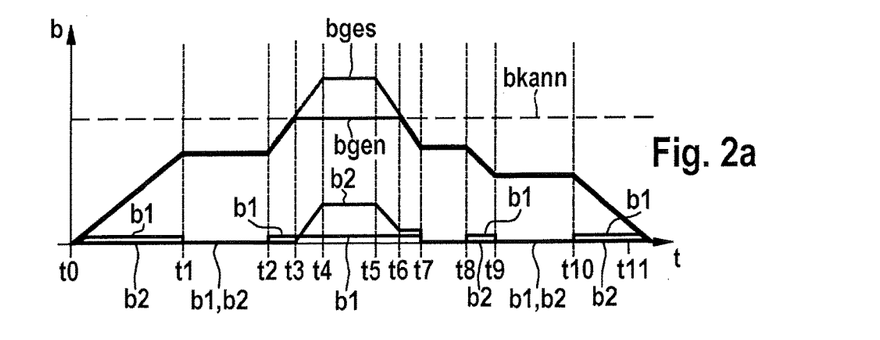
FIGS. 2a through 2d show four coordinate systems for illustrating one specific embodiment of the method for operating a braking system of a vehicle.
Figure 2B:
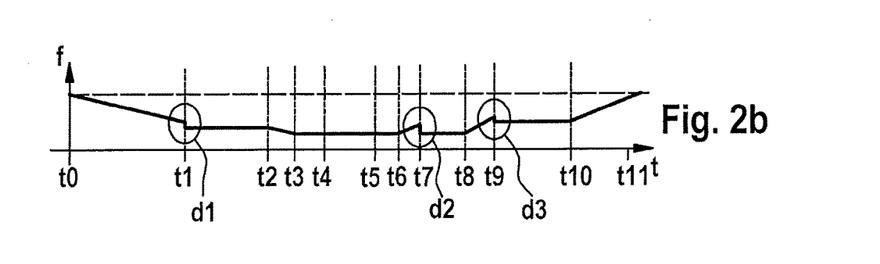
Figure 2C:
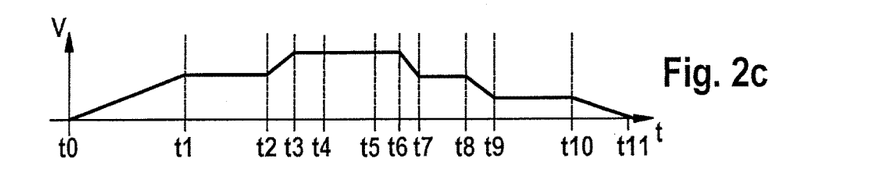

In the coordinate systems in FIGS. 2a through 2d, the abscissa is time axis t. The ordinate of the coordinate system in FIG. 2a depicts a braking torque b. With the aid of the ordinate in FIG. 2b, a ratio f/a quotient between a driver's braking force exerted by the driver on the brake actuating element and a booster force of the brake booster is represented. The ordinate of the coordinate system in FIG. 2c is a storage volume V which is temporarily stored in the storage chambers/storage volumes of the brake circuits. A (normalized) current intensity I is indicated by the ordinate of the coordinate system in FIG. 2d.

Up until a point in time t0, the driver exerts no force on the brake actuating element. Thus the brake actuating element of the braking system operated with the aid of the method is in its starting position/non-activation position until point in time t0.

Beginning at point in time t0, the driver exerts an increasing driver braking force on the brake actuating element, causing displacement of same. However, between points in time t0 and t3, setpoint total braking torque bges requested by the driver is below a maximum possible generator braking torque bkann which is providable with the aid of at least one electric motor. Thus, between points in time t0 and t1, (provided) generator braking torque bgen is correspondingly set to increasing setpoint total braking torque bges, and the entire driver braking input is carried out purely regeneratively.

For carrying out the purely regenerative braking, during points in time t0 and t1 a brake pressure buildup in the brake circuits of the braking system is limited to a response pressure of the storage chambers/storage volumes of the brake circuits (despite the activation of the brake actuating element situated at the master brake cylinder of the braking system by the driver of the vehicle.) (Prior to limiting the pressure buildup in the brake circuits to the response pressure, it is preferably ascertained whether a generator braking torque bgen corresponding to the activation intensity of the activation of the brake actuating element is exertable with the aid of the at least one electric motor of the vehicle. The limiting of the pressure buildup in the brake circuits to the response pressure is thus carried out only if the generator braking torque corresponding to the activation intensity is exertable with the aid of the at least one electric motor.)

Figure 2D:
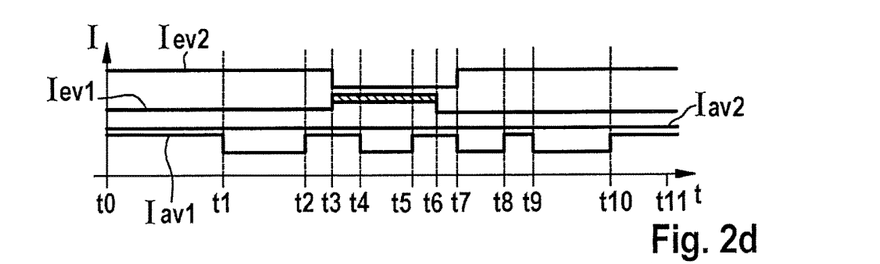

The limitation of the pressure buildup takes place by controlling the first wheel outlet valves of the first wheel brake cylinders of the brake circuits (at least temporarily) into an opened state during an increasing activation intensity of an activation of the brake actuating element connected to the master brake cylinder by the driver of the vehicle. In one design of the first wheel outlet valves of the first wheel brake cylinders of the brake circuits as de-energized closed valves, a control signal lav1, not equal to zero, between points in time t0 and t1 (as the first control signal) is output to the first wheel outlet valves.

Preferably, the first wheel inlet valves of the first wheel brake cylinders of the two brake circuits are controlled into an opened state and the second wheel inlet valves of the second wheel brake cylinders of the two brake circuits are controlled into a closed state during the limitation of the pressure buildup in the brake circuits to the response pressure. For controlling the first wheel inlet valves of the first wheel brake cylinders into the opened state, in one design of the valves as de-energized open valves, a control signal lev1, equal to zero, may be output to the first wheel inlet valves of the first wheel brake cylinders. In one design of the second wheel inlet valves of the second wheel brake cylinders as de-energized closed valves, a control signal lev2, not equal to zero, is output to the second wheel inlet valves between points in time t0 and t1. The second wheel outlet valves of the second wheel brake cylinders of the two brake circuits are also preferably closed between points in time t0 and t1. If the second wheel outlet valves of the second wheel brake cylinders are de-energized closed valves, this is achievable with the aid of a control signal lav2 equal to zero.

During points in time t0 and t1, the driver thus displaces a brake fluid volume from the master brake cylinder into the storage chambers, as the result of which storage volume V increases. Thus, between points in time t0 and t1, a first brake pressure which is equal to the response pressure of the storage chambers/storage volumes is present in the first wheel brake cylinders, and a second brake pressure of (virtually) zero is present in the second wheel brake cylinders. The first wheel brake cylinders thus bring about a first braking torque b1, which is equal to a "response pressure braking torque," between points in time t0 and t1. A second braking torque b2 of the second wheel brake cylinders of (virtually) zero is present between points in time t0 and t1. Thus, due to the limitation of the pressure buildup in the brake circuits which is brought about during points in time t0 and t1, a comparatively high generator braking torque bgen may be exerted on the vehicle with the aid of the at least one electric motor. Despite generator braking torque bgen not equal to zero being exerted, due to the above-described method steps it is reliably ensured that setpoint total braking torque bges specified by the driver with the aid of the brake actuation is not exceeded.

Despite the limiting of the pressure buildup in the brake circuits, a standard brake actuation feeling (pedal feeling) may also be ensured between points in time t0 and t1 by reducing the ratio f between the exerted driver braking force and the booster force of the brake booster. The method described here thus offers a blending of forces as well as of volumes. The driver therefore does not feel whether the braking is purely regenerative, purely hydraulic or regenerative-hydraulic.

Furthermore, the brake pressure in the brake circuits may be additionally reduced between points in time t1 and t2 to below the response pressure of the storage volumes of the brake circuits. This may be carried out reliably in particular during a constant activation intensity of the activation of the brake actuating element. (The constant activation intensity may be established with the aid of at least one brake actuating element sensor.) For additional reduction, the first wheel outlet valves are controlled to a closed state. This is achieved, for example, with a control signal lav1 (as second control signal) equal to zero output to the first wheel outlet valves of the first wheel brake cylinders.

Subsequently, the brake booster is activated in such a way that an internal pressure present in the master brake cylinder is reduced with the aid of the activated brake booster. This ensures the additional reduction already described above of the brake pressures in the first wheel brake cylinders to below the response pressure of the storage volumes. Furthermore, first braking torque b1 may thus be reduced to (virtually) zero.

The additional reduction of the brake pressure in the first wheel brake cylinders to below the response pressure of the storage volumes may be used to increase the efficiency during the recuperation. The setpoint total braking torque bges requested by the driver may thus in the ideal case be exerted to 100% as generator braking torque bgen during points in time t1 and t2. (Preferably it is ascertained before the additional reduction of the brake pressure to below the response pressure whether a generator braking torque bgen corresponding to an activation intensity is exertable, and the additional reduction of the brake pressure is carried out only if generator braking torque bgen corresponding to the activation intensity is actually exertable.) Furthermore, the additional reduction of the brake pressure in the first wheel brake cylinders to below the response pressure of the storage volumes contributes to an advantageous protection of the brake linings.

In the method described here, once a constant activation intensity of the activation of the brake actuating element is detected, the brake booster is activated in such a way that the booster force, which boosts a force exerted on the at least one piston of the master brake cylinder by the activation of the brake actuating element, exerted with the aid of the brake booster on at least one piston of the master brake cylinder, is reduced for the reduction of the internal pressure. For this purpose, the ratio f is reduced by a first difference d1 at (approximately) point in time t1. For example, the brake booster may effectuate a small reverse/outward movement of the output piston of approximately 0.2 mm. In particular when this is carried out with a low gradient, the driver feels no feedback at the brake actuating element.

As an alternative to this, the brake booster may be activated in such a way that a counterforce to the force exerted on the at least one piston of the master brake cylinder by the activation of the brake actuating element is exerted with the aid of the activated brake booster. The internal pressure in the master brake cylinder may thus be advantageously reduced also in a situation in which the brake booster effectuates no booster force on the at least one piston.

Also during the additional reduction of the brake pressure in the at least one brake circuit to below the response pressure, at least one first wheel inlet valve of the first wheel brake cylinder may be controlled into an opened state, and at least one second wheel inlet valve of one second wheel brake cylinder may be controlled into a closed state. This is possible, for example, with the aid of control signal lev1 equal to zero and with the aid of control signal lev2 not equal to zero. (Control signal lav2 may also remain equal to zero.)

Beginning at point in time t2, the driver increases the activation intensity again. The first wheel outlet valves are therefore reopened (lav1 not equal to zero.) Approximately at point in time t3, increasing setpoint total braking torque bges specified by the driver approaches the maximum achievable discretionary generator braking torque bkann. In order to continue to reliably fulfill the driver's braking intent despite the additional increase of the setpoint total braking torque bges, a second braking torque b2 not equal to zero is built up beginning at point in time t3. For this purpose, once it is ascertained after the limiting of the pressure buildup in the brake circuits to the response pressure and/or after the additional reduction of the brake pressure to below the response time that the generator braking torque bgen corresponding to the activation intensity is no longer exertable with the aid of the at least one electric motor, the second wheel inlet valves of the second wheel brake cylinders are controlled from the closed state into an opened state (e.g., with the aid of a control signal lev2 equal to zero.) The second wheel outlet valves of the second wheel brake cylinders remain closed (e.g., when control signal lav2 is equal to zero.)

Preferably, after controlling the second wheel inlet valves from the closed state into the opened state, a Δp regulation is carried out with the aid of the first wheel inlet valves of the first wheel brake cylinders. In this way, the setpoint total braking torque bges specified by the driver may be reliably maintained with the aid of the maximum achievable discretionary generator braking torque bkann and the second braking torque b2 during an increasing activation intensity (between points in time t3 and t4), during a constant activations intensity (between points in time t4 and t5) and during a decreasing activation intensity (between points in time t5 and t6.)

At point in time t6 it is detected after controlling the second wheel inlet valves from the closed state into the opened state that generator braking torque bgen corresponding to the activation intensity is once again exertable with the aid of the at least one electric motor. For this reason, beginning at point in time t6, it is once again decelerated purely regeneratively and the brake pressure present in the brake circuits is limited. This is carried out by controlling the first wheel inlet valves and the first wheel outlet valves into the opened state.

Between points in time t7 and t8, a residual brake pressure effectuated between points in time t3 through t6 by the hydraulic braking, is decreased during a constant activation intensity of the activation of the brake actuating element. For this purpose, for the renewed additional reduction of the brake pressure in the brake circuits to below the response pressure, the first wheel outlet valves of the first wheel brake cylinders are controlled (e.g., with the aid of control signal lav1 equal to zero) during a constant activation intensity of the activation of the brake actuating element into the closed state, and the brake booster is activated in such a way that the internal pressure present in the master brake cylinder is again reduced with the aid of the activated brake booster. (The first wheel inlet valves of the first wheel brake cylinders are preferably already present in the opened state.) Optionally, the second wheel inlet valves of the second wheel brake cylinders may also be controlled into the closed state (e.g., with the aid of the control signal lev2 not equal to zero.)

In order to activate the brake booster, ratio f may be reduced by a second difference d2. For example, the brake booster may this time effectuate a slightly larger reverse/outward movement of the output piston of approximately 0.4 mm. However, the numerical value given here is to be interpreted only as an example.

During a renewed reduction of the activation intensity by the driver between points in time t8 and t9, the first wheel outlet valves are reopened (e.g., with the aid of control signal lav1 not equal to zero.) Beginning at point in time t9, another phase of a constant activation intensity begins until a point in time t10. The first wheel outlet valves of the first wheel brake cylinders are therefore closed between points in time t9 and t10 (e.g., with the aid of control signal lav1 equal to zero.) Furthermore, a ratio f reduced by a third difference d3 is specified for the brake booster at point in time t9. Starting at point in time t10, the activation intensity decreases again. At a point in time t11, the driver ends the brake actuation.

What is claimed is:

1. A method for operating a braking system of a vehicle, comprising:
limiting a brake pressure buildup in at least one brake circuit of the braking system to a response pressure of a storage volume of the at least one brake circuit by controlling at least one first wheel outlet valve of at least one first wheel brake cylinder of the at least one brake circuit into an opened state at least temporarily during an increasing activation intensity of an activation of a brake actuating element connected to a master brake cylinder of the braking system by a driver of the vehicle; and providing an additional reduction of a brake pressure in the at least one brake circuit to below the response pressure during a constant activation intensity of the activation of the brake actuating element by:
controlling the at least one first wheel outlet valve of the at least one first wheel brake cylinder into a closed state; and
activating a brake booster in such a way that the internal pressure present in the master brake cylinder is reduced with the aid of the activated brake booster.

2. The method as recited in claim 1, wherein the brake booster is activated in such a way that a booster force exerted with the aid of the brake booster on at least one piston of the master brake cylinder is reduced for the reduction of the internal pressure, and wherein the booster force boosts a force exerted on the at least one piston of the master brake cylinder by the activation of the brake actuating element.

3. The method as recited in claim 1, wherein the brake booster is activated in such a way that a counterforce to a force exerted on the at least one piston of the master brake cylinder by the activation of the brake actuating element is exerted with the aid of the activated brake booster.

4. The method as recited in claim 1, wherein, at least one of (i) during the limiting of the pressure buildup in the at least one brake circuit to the response pressure and (ii) during the additional reduction of the brake pressure in the at least one brake circuit to below the response pressure, at least one first wheel inlet valve of the at least one first wheel brake cylinder is controlled into an opened state, and at least one second wheel inlet valve of at least one second wheel brake cylinder of the at least one brake circuit is controlled into a closed state.

5. The method as recited in claim 1, wherein at least one of (i) prior to limiting the pressure buildup in the at least one brake circuit to the response pressure, and (ii) prior to the additional reduction of the brake pressure in the at least one brake circuit to below the response pressure, it is ascertained whether a generator braking torque corresponding to an activation intensity of the activation of the brake actuating element is exertable with the aid of at least one electric motor of the vehicle, and wherein at least one of the limiting of the pressure buildup in the at least one brake circuit to below the response pressure and the additional reduction of the brake pressure in the at least one brake circuit below the response pressure is carried out only if the generator braking torque corresponding to the activation intensity is exertable with the aid of the at least one electric motor.

6. The method as recited in claim 5, wherein, provided that it is ascertained after the at least one of the limiting of the pressure buildup in the at least one brake circuit to the response pressure and the additional reduction of the brake pressure in the at least one brake circuit to below the response time that the generator braking torque corresponding to the activation intensity is no longer exertable with the aid of the at least one electric motor, the at least one second wheel inlet valve of the at least one second wheel brake cylinder is controlled from the closed state into an opened state.

7. The method as recited in claim 6, wherein after controlling the at least one second wheel inlet valve from the closed state into the opened state, a differential pressure regulation is carried out with the aid of the at least one first wheel inlet valve of the at least one first wheel brake cylinder.

8. The method as recited in claim 6, wherein, if, after controlling the at least one second wheel inlet valve from the closed state into the opened state, it is ascertained that the generator braking torque corresponding to the activation intensity is once again exertable with the aid of the at least one electric motor, the brake pressure present in the at least one brake circuit is limited by controlling the at least one first wheel inlet valve and the at least one first wheel outlet valve into the opened state.

9. The method as recited in claim 8, wherein for again reducing the brake pressure in the at least one brake circuit to below the response pressure, during a decreasing activation intensity of the activation of the brake actuating element, the at least one first wheel outlet valve of the at least one first wheel brake cylinder is controlled into the closed state and the brake booster is activated in such a way that the internal pressure present in the master brake cylinder is again reduced with the aid of the activated brake booster.

10. A control device for a braking system of a vehicle, comprising:

an actuating device configured to actuate at least one first wheel outlet valve of at least one first wheel brake cylinder of at least one brake circuit of the braking system into an opened state taking into account at least one provided sensor signal regarding an activation intensity of an activation of a brake actuating element connected to a master brake cylinder of the braking system by a driver of the vehicle in such a way that a brake pressure buildup in the at least one brake circuit is at least temporarily limited to a response pressure of a storage volume of the at least one brake circuit during an increasing activation intensity of the activation of the brake actuating element;

wherein, with the aid of the actuating device, a brake booster is controlled during a constant activation intensity of the activation of the brake actuating element taking at least the provided sensor signal into account in such a way that after the at least one wheel outlet valve is controlled with the aid of the actuating device into a closed state, an internal pressure present in the master brake cylinder is reduced with the aid of the activated brake booster in such a way that the brake pressure in the at least one brake circuit is additionally reduced to below the response pressure.

* * * * *